United States Patent [19]
Kobayashi et al.

[11] Patent Number: 5,246,362
[45] Date of Patent: Sep. 21, 1993

[54] AUTOMATIC SUB-MOLD CHANGER

[75] Inventors: Koichi Kobayashi; Seiji Mishima; Kenji Kamio; Etsuhisa Miyata; Katsuhiko Fukuda; Junichi Oi, all of Tokyo, Japan

[73] Assignee: Seikosha Co., Ltd., Tokyo, Japan

[21] Appl. No.: 1,436

[22] Filed: Jan. 14, 1993

Related U.S. Application Data

[63] Continuation of Ser. No. 812,777, Dec. 23, 1991, abandoned.

[51] Int. Cl.⁵ ............................................. B29B 13/00
[52] U.S. Cl. .................................... 425/135; 425/183; 425/193
[58] Field of Search ............... 425/135, 182, 183, 193, 425/195

[56] References Cited
U.S. PATENT DOCUMENTS
4,946,358 8/1990 Okuda et al. .................. 425/183

FOREIGN PATENT DOCUMENTS
0207169 1/1987 European Pat. Off.
0973471 10/1964 United Kingdom.
1032412 6/1966 United Kingdom.
1397111 6/1975 United Kingdom.
1397439 6/1975 United Kingdom.

Primary Examiner—Charles Hart
Attorney, Agent, or Firm—Jordan and Hamburg

[57] ABSTRACT

An automatic sub-mold changer for use in an injection molding machine having a pair of molds in which sub-molds are detachably installed in an open state of the molds includes a sub-mold stock device for stocking plural sub-molds therein, the sub-mold stock device being spaced from the pair of molds on the injection molding machine. An arm device having an end portion which carries chucks to which the sub-molds are detachably affixed is movable between a first position juxtaposed to the sub-mold stock device and a second position juxtaposed to the pair of molds on the injection molding machine.

20 Claims, 8 Drawing Sheets

AUTOMATIC SUB-MOLD CHANGER

This application is a continuation of application Ser. No. 07/812,777, filed Dec. 23, 1991 now abandoned.

BACKGROUND OF THE INVENTION

A mold for use at an injection molding machine is ordinarily provided with plural cavities in a parting line (PL) plane thereof for the purpose of producing a number of molded products.

When plural forms are required to be prepared using a mold having cavities formed therein, a different mold must be prepared for each form, that is, plural molds must be prepared for the required forms. This causes the overall cost to be increased. In order to overcome the above disadvantage, there has been proposed a technique in which plural sub-molds each having cavities are prepared, one of the prepared sub-molds is selected in accordance with a required form and then the selected sub-mold is inserted into a common mold. When a sub-mold is exchanged for another one in this technique, the entire mold is removed from a molding machine while suspending the mold with a crane or the like, and then a sub-mold accommodated in the mold is exchanged for another one.

The removing operation of the entire mold causes a tremendous risk because the mold itself has a heavy weight. In addition, the removing operation itself requires a long time and many hands, so that the removing operation is obstacle to an automation of a series of injection molding processes.

SUMMARY OF THE INVENTION

Therefore, an object of this invention is to provide an automatic sub-mold changer capable of safely exchanging a sub-mold for another one for a short time and without many hands in an injection molding machine equipped with a pair of molds to which sub-molds are freely detachably installed, and thus capable of providing for the automation of a series of injection molding processes.

In order to attain the above object, an automatic sub-mold changer according to this invention is provided in association with an injection molding machine equipped with a pair of molds in which sub-molds are detachably installed in an open state of the molds, and comprises sub-mold stock means for stocking plural sub-molds therein, and arm means having at a tip portion thereof a chuck portion to which the sub-molds are freely detachably fixed, the arm means being freely movable between a stocking portion of the sub-mold stock means and a space between the molds in the open state.

The arm means preferably comprises a first arm for a movable-side mold and a second arm for a fixed-side mold.

Each of the sub-molds is preferably provided with identification information representing the kind thereof, and the stocking portion or the chuck portion is preferably provided with a reader for reading out the identification information. The identification information is preferably a bar code.

The stocking portion is preferably provided with a heater for heating the sub-molds which are stocked in the stocking portion.

The chuck portion which is provided at the tip portion of the arm means is inserted in a space between a pair of molds in an open state, and holds the sub-molds. Thereafter, the arm means is moved to shift the chuck portion to the stocking portion of the sub-mold stock means so that the sub-molds are stocked in the stocking portion. Next, other sub-molds stocked in the stocking portion are held by the chuck portion, and carried to the space between the molds by the arm means to fixedly install the sub-molds into the molds.

The arm means comprises the first arm for the movable-side mold and the second arm for the fixed-side mold, and thus the sub-molds in the movable-side mold and the sub-molds in the fixed-side mold can be individually held by the different arms. Accordingly, even in a case where the space between the molds is narrow, the sub-mold exchanging operation can be easily performed by inserting one of the arms into the space after the other arm holding the sub-molds in one of the molds is moved away from the space.

Further, each of the sub-molds is provided with identification information representing the kind thereof, so that an erroneous exchanging operation can be completely prevented by detecting the identification information of sub-molds to be next used.

Still further, the stocking portion is provided with the heater to preheat the sub-molds which are stocked in the stocking portion. Therefore, heating of the sub-molds after installed into the molds is not required and thus the injection molding process is started immediately after the sub-molds are installed into the molds.

A preferred embodiment of this invention will be described hereunder with reference to the accompanying drawings.

BRIEF DESCRIPTION OF THE DRAWINGS:

FIG. 1 is a partly broken-out plan view of the automatic sub-mold changer according to this invention.

FIG. 2 is a partly broken-out side view of the automatic sub-mold changer as shown in FIG. 1, which is viewed from the right side.

FIG. 3 is a front view of the guide means of FIG. 1, which is viewed from the side of the arm means 5.

FIG. 4 is a perspective view of the sub-mold stock means;

FIG. 5 is a perspective view showing the sub-mold holding state of the hold spring 4 of FIG. 4.

FIG. 6 is a perspective view of a sub-mold;

FIG. 7 is a plan view of the sub-mold stock means, and

FIG. 8 is a side view of a state where the arm 4 is driven to go ahead in FIG. 2.

DESCRIPTION OF THE PREFERRED EMBODIMENTS

Figure 1:
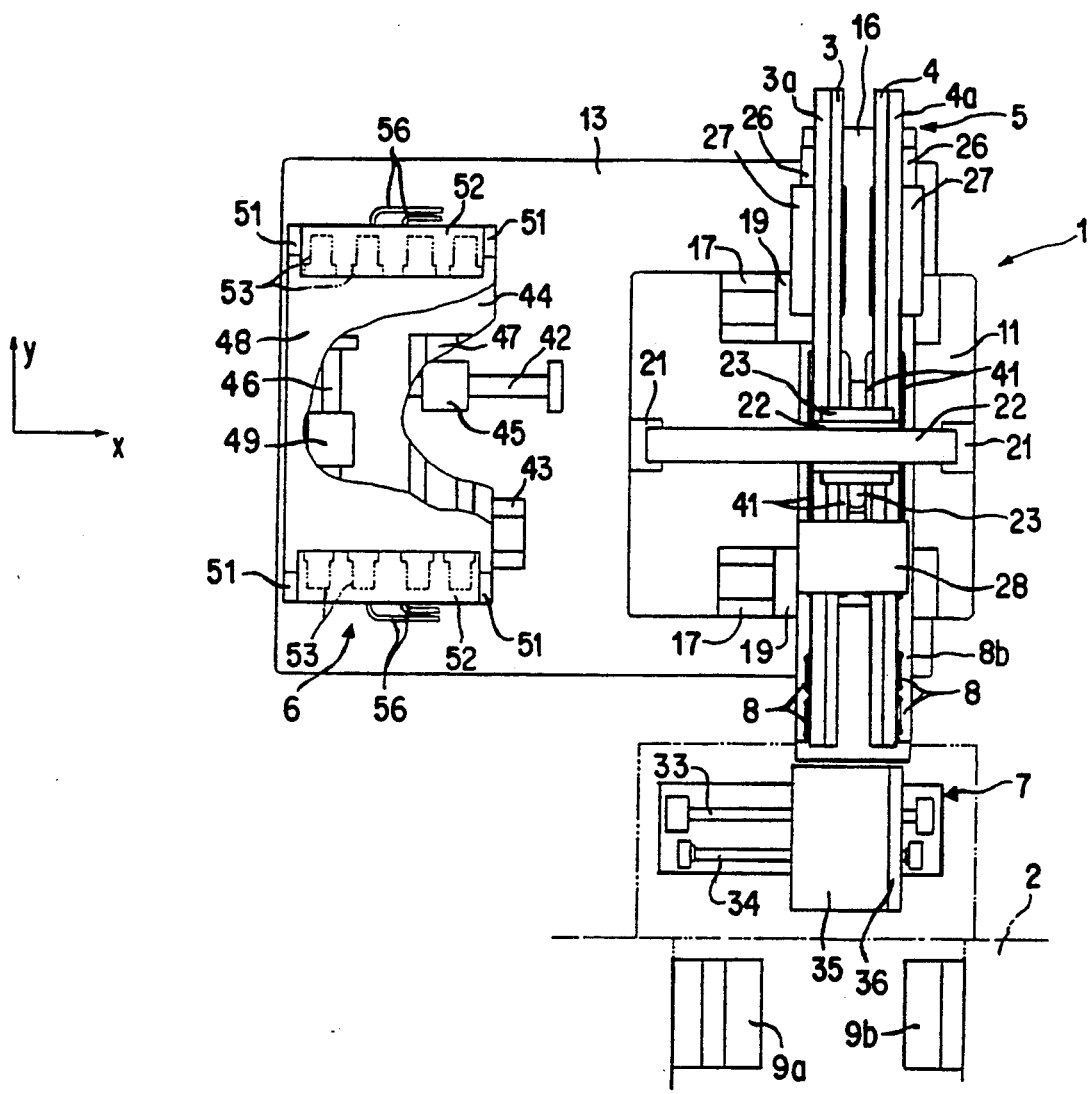
FIGS. 1 to 8 show an embodiment of an automatic sub-mold changer according to this invention.
Figure 2:
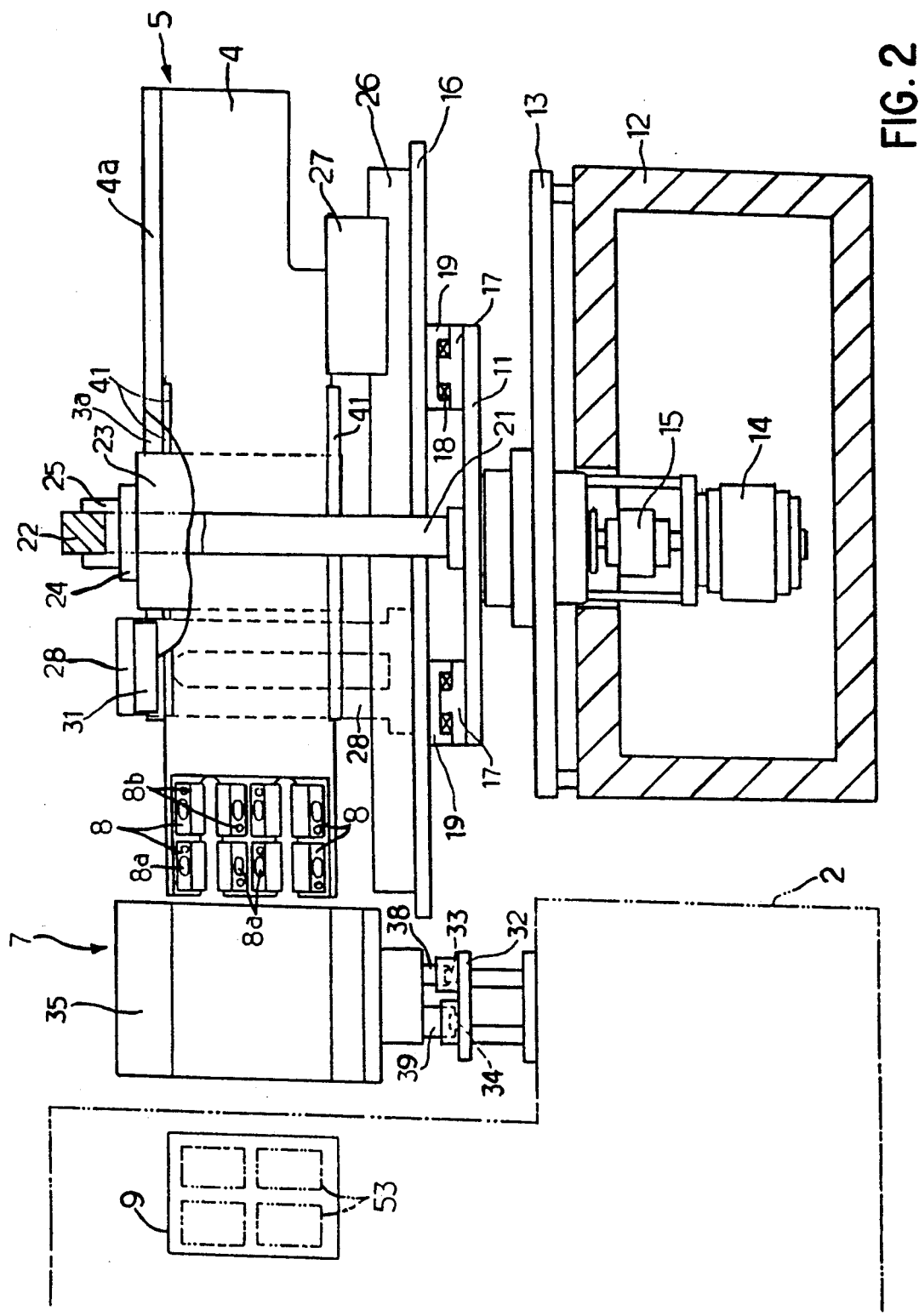

FIG. 1 is a plan view showing the construction of an automatic sub-mold changer according to this invention, and FIG. 2 is a side view of the automatic sub-mold changer as shown in FIG. 1, which is viewed in an x-direction.

An automatic sub-mold changer 1 is provided adjacently to an injection molding machine 2. The automatic sub-mold changer 1 comprises arm means 5 including a first arm 3 and a second arm 4 which are rotatable and movable in a left-and-right direction and an up-and-down direction of FIG. 1 (hereinafter referred to as "x-direction and y-direction", respectively), stock means of sub-mold (sub-mold stock means) 6 which is movable in the x- and y-directions, and guide means 7 as described later. The first and second arms 3 and 4 are provided with chucks 8 at tip portions thereof, respectively.

In the automatic sub-mold changer thus constructed, an exchange operation of changeable sub-molds is performed as follows. Changeable sub-molds which are freely detachably installed in a movable-side mold 9a and a fixed-side mold 9b are adsorbed by the chucks 8 (detachably fixed to the chucks by air suction), and then carried to and stocked in the sub-mold stock means 6. Thereafter, other changeable sub-molds which are stocked in the stock means 6 are adsorbed by the chucks 8 (detachably fixed to the chucks 8 by air suction), and then carried to and fixedly installed into the movable-side and fixed-side molds 9a and 9b. Since the arms 3 and 4 are unstably supported at one sides thereof (that is, cantilevered) when moved frontwards (that is, downwardly in FIG. 1), the guide means 7 serves to stably support the arms 3 and 4.

Each of the movable-side mold 9a and the fixed-side mold 9b is provided in a vertical direction to the PL (parting line) plane with hollows (recesses) for sub-molds (not shown) into which four changeable sub-molds are insertable (hereinafter referred to as "sub-mold hollows"). In order to fixedly secure the inserted changeable sub-molds into the movable-side and fixed-side molds 9a and 9b, engaging keys (not shown) which are used to fixedly secure the changeable sub-molds to the sub-mold hollows through the engagement with the sub-molds are also provided in such a manner as to be inserted into key grooves which are formed in parallel to the PL planes of the movable-side and fixed-side molds 9a and 9b.

The arm means will be hereunder described in more detail.

In FIG. 2, the arm means 5 is mounted on a rotary table 11, and the rotary table 11 is rotatably and pivotably supported by a fixed table 13 which is fixed to a fixed mount table 12. The rotary table 11 is rotated through a coupling 15 by a rotary actuator 14 which is secured to the fixed table 13. The fixed table 13 is designed so as to extend to a left side of FIG. 1 where the stock means 6 is disposed.

A pair of rails 17 each extending in the x-direction of FIG. 1 are provided on the rotary table 11 while a pair of guides 19 are fixedly secured to a lower surface of a support table for arm means (hereinafter referred to as "arm support table 16"), and the rails 17 and the guides 19 are engaged through a slide bearing 18, whereby the arm support table 16 is slidably moved in the x-direction in FIG. 1 along the rails 17.

A pair of support poles 21 are projectingly provided at left and right side positions on the rotary table 11 as shown in FIG. 1, and a cylinder 22 is provided suspensively between the top ends of the poles 21. In addition, a guide plate 23 which is sandwiched between the arms 3 and 4 is fixedly secured to a slider 25 through a coupling member 24. The cylinder 22 serves as a rodless cylinder for driving the slider 25. That is, the cylinder 22 has a hollow or cavity structure extending in an axial direction thereof, and a part of the slider 25 is inserted into the cavity of the cylinder 22. The slider 25 is slidably moved along the cylinder 22 by means of blowing air against the inserted part of the slider 25 within the cavity or by other means. The rodless cylinder 22 enables the guide plate 23 to be moved in the x-direction as shown in FIG. 1, and thus enables the arms 3 and 4 sandwiching the guide plate 23 to be moved in the x-direction interlockingly with the movement of the guide plate 23. As described later, the arms 3 and 4 are unmovable in the x-direction relatively to the arm support table 16, and thus the arm support table 16 is also moved along the rail 17 interlockingly with the movement of the arms 3 and 4, that is, with the driving of the rodless cylinder 22. The guide plate 23 is sandwiched by the arms 3 and 4 through protection plates 41 as described later, whereby the arms 3 and 4 are protected from being damaged.

A pair of cylinders 26 each extending in the y-direction as shown in FIG. 1 (in the left-and-right direction in FIG. 2) are fixedly secured onto the arm support table 16, and sliders 27 which are secured to the arms 3 and 4 are engaged with the cylinders 26. Like the cylinder 22, the cylinders 26 serve as rodless cylinders for driving the sliders 27. A holder 28 having a T-shaped section on a plane which is vertical to the drawing and parallel to the x-direction is fixedly provided on the arm support table 16 at a lower side of the rotary table 11 in FIG. 1, and guides 31 are secured to both sides of an upper plate of the holder 28. The guide 31 is freely slidably engaged with rails 3a and 4a which are provided at upper portions of the arms 3 and 4, respectively. As described above, the arms 3 and 4 are slidably moved in the y-direction as shown in FIG. 1 by a driving force of the rodless cylinder 26 while guided by the guide 31.

Four chucks 8 are provided at the outside of the tip portion of each of the arms 3 and 4. Each chuck 8 is provide with a pair of air suction ports 8a as shown in FIG. 2 at upper and lower portions thereof. Each of the air suction ports 8a is coupled through a pipe (not shown) to a vacuum pump (not shown). Therefore, air is sucked through the air suction port 8a by actuating the vacuum pump, and sub-molds which are in contact with the chucks are adsorbed by the air sucking force. Each of the chucks 8 is provided with a pair of positioning pins 8b at symmetrical corners thereof.

Next, the guide means 7 will be described in more detail.

Figure 3:
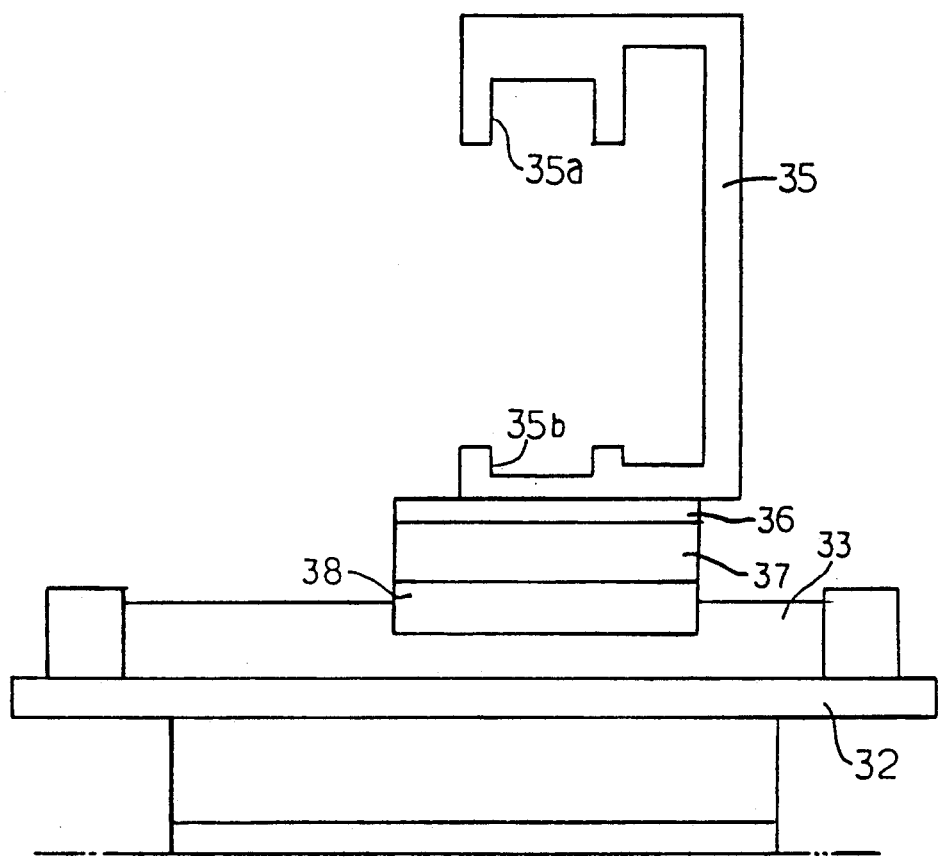

A mount table 32 is integrally secured to the injection molding machine 2 as shown in FIG. 2, and a cylinder 33 and a rail 34 are secured onto the mount table 32 along a opening-and-closing direction of the molds as shown in FIG. 1. As shown in FIGS. 2 and 3, a slider 38 and a guide 39 are secured to a U-shaped guide member 35 through coupling members 36 and 37, and the slider 38 and the guide 39 are engaged with the cylinder 33 and the rail 34, respectively. The cylinder 33 serves as a rodless cylinder for driving the slider 38, and thus the guide member 35 is slidably movable in the opening and closing direction of the molds along the rail 34 by a driving force of the rodless cylinder 33.

Figure 8:
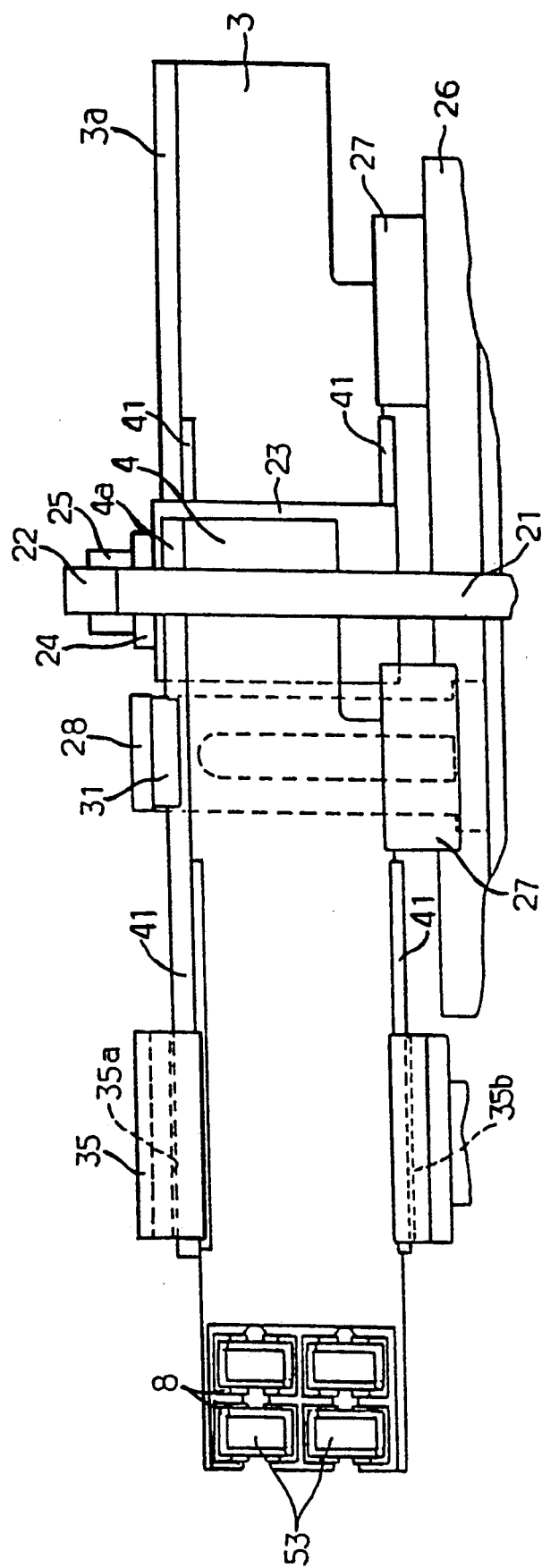

At the inner surfaces of the upper and lower portions of the guide member 35 are formed guide grooves 35a and 35b. Any one of the arms 3 and 4 is inserted into the grooves 35a and 35b and supported at this inserting position. Further, the protection plates 41 are provided at the upper and lower end portions of both surfaces of the arms 3 and 4, and the arms 3 and 4 are supported through the protection plates 41 in the guide grooves 35a and 35b as shown in FIG. 8.

Next, the sub-mold stock means 6 will be described hereunder.

As described above, the sub-mold stock means 6 is disposed at the left side of the fixed table 13. In this embodiment, a line connecting the rotational axis of the rotary table 11 and the molds 9a and 9b and another line connecting the rotational axis of the rotary table 11 and the sub-mold stock means 6 are set to be intersected at substantially 90°.

The sub-mold stock means 6 includes two tables, an x-table and a y-table which are disposed at upper and lower portions of the stock means 6 and movable in the x-direction and y-direction, respectively. A cylinder 42 and a rail 43 are fixed in the x-direction at a left portion of the fixed table 13, and a slider 45 and a guide (not shown) which are engaged with the cylinder 42 and the rail 43 respectively are fixed at the lower surface of an x-table 44. The cylinder 42 serves as a rodless cylinder for driving the slider 45, and the x-table 44 is slidable in the x-direction along the rail 43 by a driving force of the rodless cylinder 42. Further, a rodless cylinder 46 and a rail 47 are likewisely fixed in the y-direction on the upper surface of the x-table 44, and a cylinder 49 and a guide (not shown) which are engaged with the rodless cylinder 46 and the rail 47 respectively are fixed at the lower surface of the y-table 48. The y-table is movable in the y-direction along the rail 47.

Figure 4:
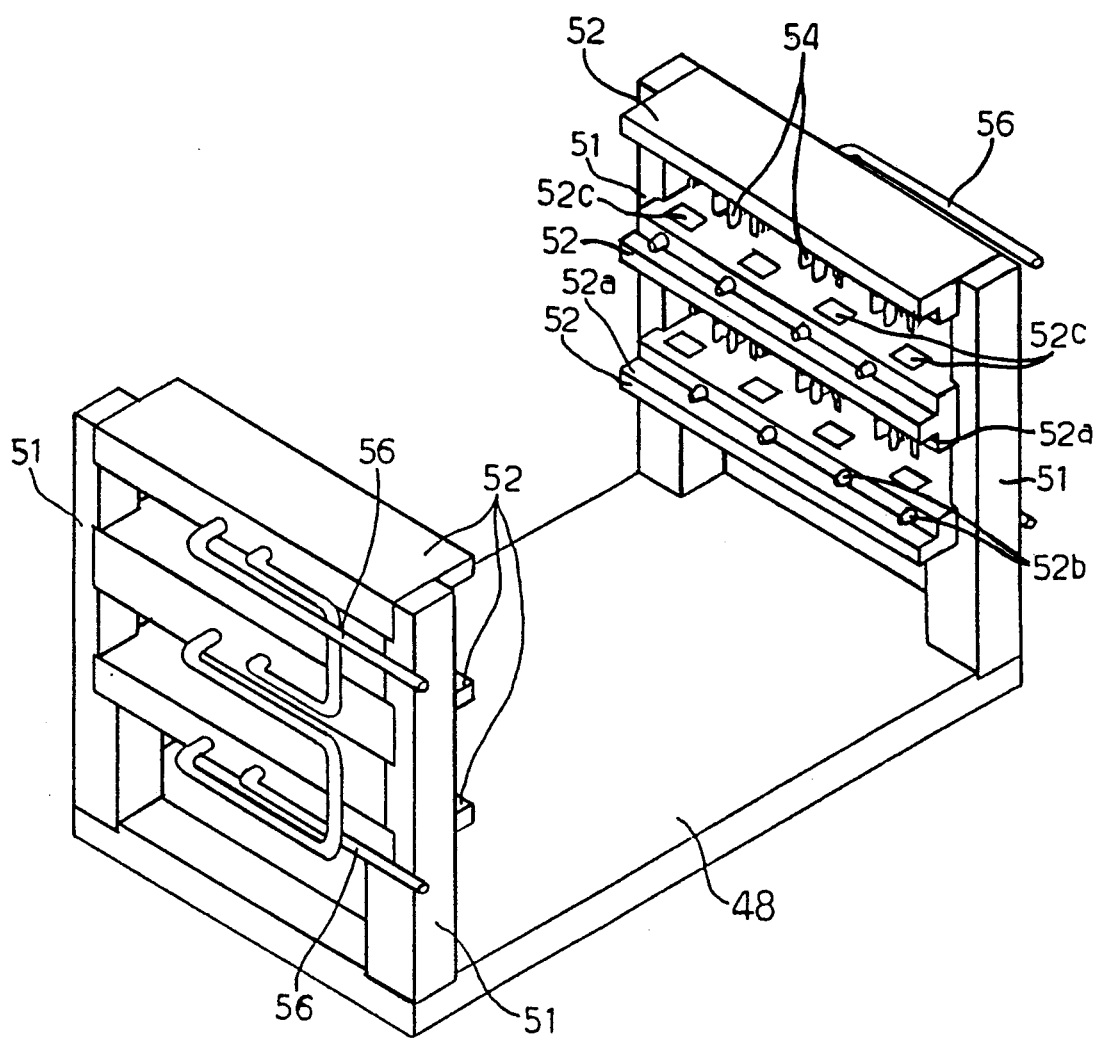

Four poles 51 are projectingly provided at the four corners of the y-table 48 as shown in FIG. 4, and a three-stage shelf assembly comprising three shelf plates 52 which are arranged in a vertical direction of FIG. 4 is suspensively provided between each pair of neighboring poles which are confronted to each other in a direction vertical to a longitudinal direction of the y-table 48. The upper and lower spaces defined between the respective shelf plates 52 of each three-stage shelf assembly serve as upper and lower sub-mold stocking portions each having stock capability for stocking four changeable sub-molds.

Figure 5:
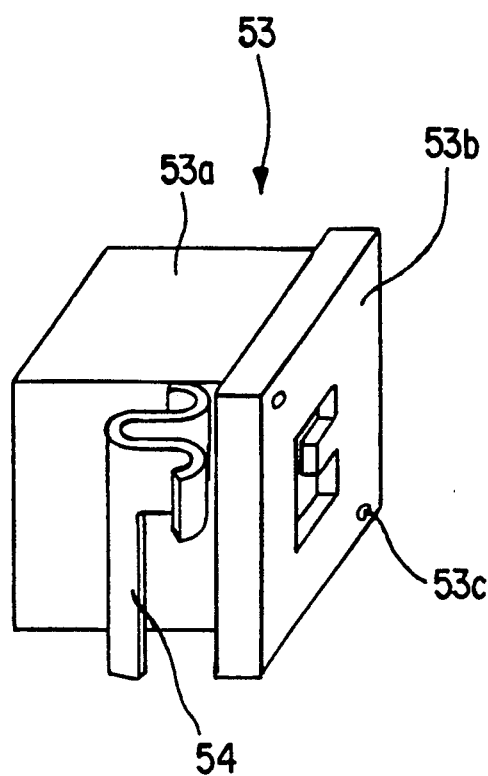
Figure 6:
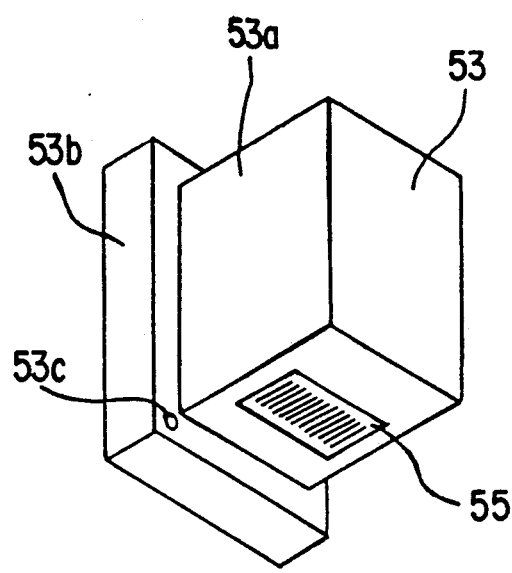

As shown in FIGS. 5 and 6, each changeable sub-mold 53 has a flange portion 53b on the front surface of a body 53a thereof. A pair of positioning holes 53c are formed at two corners which are diagonally confronted to each other on the flange portion 53b. In correspondence to this arrangement of the sub-mold 53, a shoulder portion 52a for accommodating the flange portion 53b of the sub-mold 53 is provided on each shelf plate 52, and a positioning pin 52b is provided on the shoulder portion 52a. In order to prevent the sub-mold 53 from falling off from the shelf plate 52, a hold spring 54 is provided at a position between respective neighboring sub-molds to be accommodated on the shelf plate 52. As shown in FIG. 5, the hold spring 54 is formed by bending a plate spring, and is so designed that the body portion 53a of the sub-mold 53 is supported by respective one end portions of a pair of hold springs 54. No hold spring 54 is provided to both end portions of each shelf plate 52 because one side of the sub-molds on the end portions are supported by the poles 51.

As shown in FIG. 6, a bar code 55 is attached to the bottom surface of the sub-mold 53, and a glass window 52c is provided at a position on each shelf plate 52 where the bar code 55 is located when the sub-mold 53 is accommodated in a space between the shelf plates 53. A bar code reader for reading out the bar code of each sub-mold is provided within each glass window 52c, and the kind of the sub-mold is detected on the basis of the read-out bar code.

Figure 7:
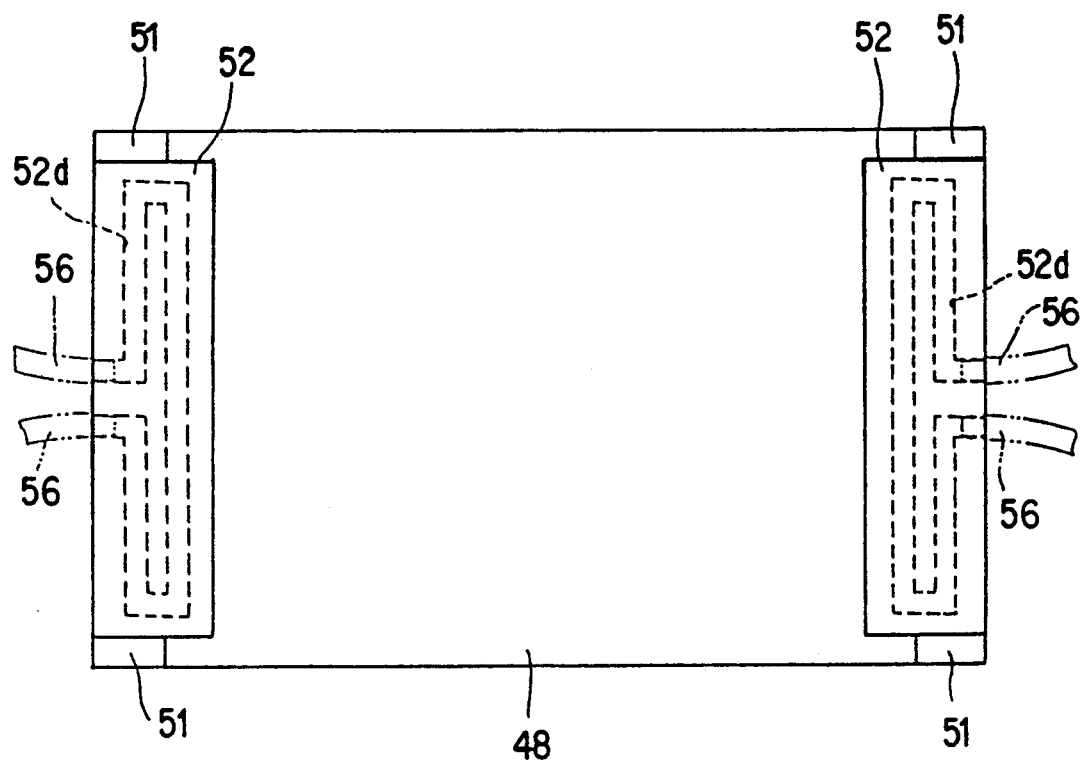

As shown in FIG. 7, an oil passageway 52d (a passageway for oil) is provided within each shelf plate 52 to circulate oil in the whole portion of the shelf plate 52, and tubes 56 are secured to the inlet and outlet of the oil passageway 52d. The tubes 56 of the respective shelf plates 52 of the three-stage shelf assembly are connected to one another, and finally connected to an oil heater (not shown). Therefore, the shelf plates 52 are heated by circulating the heated oil through the oil passageways 52d of the shelf plates 52.

The operation of the automatic sub-mold changer of this invention will be next described.

The following description is made in a case where a manufacturing process using one kind of sub-molds is completed, and a manufacturing process using another kind of sub-molds is carried out.

First, in response to an instruction of a CPU of the automatic sub-mold changer according to this invention, the arm support table 16 and the guide member 35 of the guide means 7 are moved in the x-direction as shown in FIG. 1 and stopped at a predetermined position in order to remove sub-molds which are installed, for example, in the fixed-side mold 9b. Thereafter, the second arm 4 located at the right side in FIG. 1 is driven to go ahead (moved downwardly in FIG. 1) slidably along the grooves 35a and 35b, and stopped at a position between the molds 9a and 9b where the chucks 8 confront the sub-molds in the fixed-side mold 9b as shown in FIG. 8. The arm support table 16 and the guide member 35 are interlockingly moved in the right direction in FIG. 1, and stopped at a position where the positioning pins 8b of the chucks 8 are engaged with the positioning holes 53c of the sub-molds.

Next, the key is pulled out of the key groove by an air cylinder (not shown), and at the same time the vacuum pump is actuated to attach the four sub-molds to the respective chucks 8 by air suction. Thereafter, the arm support table 16 and the guide member 35 are interlockingly moved in the left direction in FIG. 1 to remove the sub-molds from the sub-mold hollows (recesses), and then the arm 4 is driven to go back (moved upwardly in FIG. 1). Next, in order to remove sub-molds from the movable-side mold 9a, in the same manner as described above, the first arm 3 is driven to go ahead (moved downwardly in FIG. 1) while supported by the guide member 35, and then is leftwardly moved to fix the four sub-molds of the movable-side mold 9a to the chucks by air suction. Thereafter, the first arm 3 is driven to go back (moved upwardly in FIG. 1).

Next, the rotary table 11 is clockwisely rotated by 90° in FIG. 1 by actuation of the rotary actuator 14, whereby the arms 3 and 4 are driven so as to be oriented in the x-direction. Thereafter, the arms 3 and 4 are driven to go ahead (to be moved in the left direction in FIG. 1) to a position where the chucks 8 confront to vacant positions of the sub-mold stock means 6 (for example, two rows at the left side), and the movement of the arms 3 and 4 in the x-direction is ceased. Next, the arm support table 16 is moved, for example, upwardly in the y-direction in FIG. 1, and the positioning holes 53c are engaged with the positioning pins 52b, whereby the sub-molds are accurately stocked in the corresponding stock spaces. Each of the stocked sub-molds are supported at both ends thereof by the hold springs 54, and then the air suction is ceased. Thereafter, the arm support table 16 is moved downwardly in the y-direction in FIG. 1, and at the same time the sub-molds attached to the arm 4 are stocked in the corresponding stock spaces.

Next, the arm support table 16 goes back slightly (is slightly moved in the right direction in FIG. 1) so that the arms 3 and 4 are moved to the right side in the x-direction, and stopped at a position where the chucks 8 confront two rows at the right side at which sub-molds are stocked. Thereafter, the arm support table 16 is moved downwardly in the y-direction in FIG. 1 so as to engage the positioning pins 8b of the chucks 8 with the positioning holes 53c of the new sub-molds, and the sub-molds are fixed to the chucks by air suction. In this case, the sub-molds are provided with bar codes 55, and the sub-molds to be next installed in the injection molding machine are confirmed beforehand by reading out the bar codes thereof on the basis of the instruction of the CPU using the bar code reader, so that the desired sub-molds are surely adsorbed by the arms 4. Thereafter, the arm support table 16 is moved upwardly in the y-direction in FIG. 1 to fix the sub-molds to the arm 3 by air suction in the same manner as described above. When the sub-molds are fixed to both of the arms 3 and 4, the arm support table 16 goes back slightly (is slightly moved to the right side in the x-direction of FIG. 1), the arms 3 and 4 go back (are moved to the right side in the x-direction), and then the rotary table 11 is counter-clockwise rotated by 90°. In an inverse order to that of the sub-mold removing process, the sub-molds attached to the arms 3 and 4 are installed into the movable-side mold 9a and the fixed-side mold 9b, and the arms 3 and 4 are driven to go back. Through these operations, the sub-mold exchanging operation is completed.

The sub-molds are beforehand heated through thermal conduction by the heated shelf plates 52, and thus an injection molding process can be started at the same time when the sub-mold exchanging operation is completed.

Since this invention is applied to an operation of exchanging only the sib-molds, material having high mechanical strength which must be used when the entire mold is required to be supported is not required for the arms 3 and 4 and other elements of this invention because these arms 3 and 4 are used to support only the sub-molds. Therefore, the sub-mold changer can be miniaturized, and an operating work can be improved. Further, since the first and second arms 3 and 4 are provided at the tip portions thereof with the chucks whose number is equal to that of the sub-molds of the molds 9a and 9b and which has the same arrangement as the sub-molds of the molds 9a and 9b, the sub-molds can be simultaneously attached to or detached from the mold 9a or 9b through one contacting or detaching operation of the arms 3 and 4 to or from the mold 9a or 9b, so that the time required for the sub-mold exchanging operation can be shortened.

In the sub-mold exchanging operation of the above embodiment, the x-table 44 and y-table 48 of the sub-mold stock means 6 are not moved. However, after the arms 3 and 4 are clockwisely rotated by 90°, the x-table 44 and the u-table 48 may be moved to approach the chucks to the stock means. Otherwise, after the arms 3 and 4 are clockwisely rotated by 90°, all of the x-table 44, the y-table 48 and the arms 3 and 4 may be moved to approach the chucks 8 to the stock means.

Further, in the above embodiment, the guide means 7 is secured to the injection molding machine 2, however, it may be secured to the fixed table 13 or the like.

The sub-mold changer of the above embodiment is so designed that the sub-molds are held by the chucks through air suction, however, the sub-molds may be held by the chucks through various means such as a mechanical chuck, oil pressure, magnet and so on.

In the above embodiment, the heated oil which is circulated in the shelf plates 52 is used as a heater. However, other heating means may be adopted. For example, a nickel-chrome wire is embedded into each shelf plate 52 and current flows into the nickel-chrome wire to heat the shelf plate 52.

Further, in the above embodiment, the bar code reader is provided on the stock means. However, the bar code reader may be provided on the chucks 8 and designed so as to read out the bar codes of the sub-molds when the chucks 8 approach the sub-molds. The position where the bar code is provided is not limited to the above embodiment, and may be any position such as the flange portion of the sub-mold or the back surface of the sub-mold. In this case, the bar coder reader may be disposed in the sub-mold stock means in a built-in type or as a separate member in such a manner as to confront the bar code. Also, the bar code is used as identification information for sub-molds in the above embodiment. In place of the bar code, different marks may be assigned to different kinds of sub-molds and read out by a photosensor or the like. At any rate, various kinds of identification information and reading means may be adopted.

Still further, in the above embodiment, the sub-mold is inserted or detached in the vertical direction to the PL plane of the mold. However, this invention is applicable to a case where the sub-mold is inserted or detached in a parallel direction to the PL plane. Other modification may be made to the above embodiment without departing from the subject matter of this invention.

According to the automatic sub-mold changer, the sub-molds are automatically removed from the molds to be stocked in the stocking portion, and another kind of sub-molds in the stocking portion are automatically installed into the molds. This automatically exchanging operation of the sub-molds enables the injection molding machine to be automatically operated. In addition, since only the sub-molds are exchanged for other ones, the exchanging apparatus itself can be miniaturized, and the exchanging work can be safely performed.

Further, the sub-molds are provided with respective identification information and the reader for reading out the identification information is equipped with the stocking portion or the chucks, so that an incorrect kind of sub-molds can be prevented from being erroneously installed into the molds and thus the sub-mold exchanging operation can be accurately performed.

Still further, according to this invention, since the heater is provided to the stocking portion, the sub-molds are beforehand heated to enable the injection molding process to start at the same time when the sub-molds are installed into the molds, and thus a loss time for the injection molding process can be greatly reduced.

What is claimed is:

1. An automatic sub-mold changer for use in an injection molding machine having a pair of molds in which sub-molds are detachably installed in an open state of the molds, comprising:
   sub-mold stock means for stocking plural sub-molds therein, said sub-mold stock means being spaced from said pair of molds on said injection molding machine; and
   arm means having an end portion which carries chuck means to which said sub-molds are detachably affixed, said arm means being movable between a first position juxtaposed to said sub-mold stock means and a second position juxtaposed to said pair of molds by rotation in a horizontal plane on said injection molding machine.

2. An automatic sub-mold changer according to claim 1, wherein said pair of molds on said injection machine include a movable-side mold and a fixed-side mold, said arm means comprising a first arm for said movable-side mold and a second arm for said fixed-side mold.

3. An automatic sub-mold changer according to claim 1 further comprising identification means on each of said sub-molds for identifying each sub-mold, and a reader means on said sub-mold stock means for reading said identification means on each of said sub-molds.

4. An automatic sub-mold changer according to claim 3, wherein said identification means comprises a bar code.

5. An automatic sub-mold changer according to claim 1, wherein said sub-mold stock means is provided with a heater for heating the sub-molds which are stocked in said sub-mold stock means.

6. An automatic sub-mold changer for use in an injection molding machine having a pair of mounted molds movable between open and closed positions and wherein sub-molds are installed in said mounted molds and removable from said mounted molds when said mounted molds are in said open position, comprising:
  sub-mold stock means for stocking a plurality of sub-molds, said sub-mold stock means being spaced from said mounted molds;
  arm means having an end portion with chuck means affixed to said end portion, said chuck means being operable to attach thereto and release therefrom said submolds; and
  operating means for moving said arm means to a first position juxtaposed to said sub-mold stock means where said chuck means is operable to attach thereto a sub-mold from said sub-mold stock means and also operable to release a sub-mold therefrom to said sub-mold stock means, said operating means being operable to move said arm means to a second position juxtaposed to said mounted molds when said mounted molds are in said open position where said chuck means is operable to attach a sub-mold thereto from either of said mounted molds and to release therefrom a sub-mold onto either of said mounted molds.

7. An automatic sub-mold changer according to claim 6 further comprising identification means on each of said sub-molds and a reader means for reading said identification means on said sub-mold stocking means.

8. An automatic sub-mold changer according to claim 6 further comprising identification means on each of said sub-molds and a reader means for reading said identification means on said chuck means.

9. An automatic sub-mold changer according to claim 6 further comprising guide means interposed between said mounted molds of said injection machine and said arm means, said arm means comprising arms movable between a retracted and an extended position, said guide means guiding said arms as said arms are moved between said retracted and extended position.

10. An automatic sub-mold changer according to claim 9, wherein said arms are movable in a first direction between said retracted and extended positions when said arm means is in said second position, said guide means comprising movable guide parts movably mounted on a fixed guide part, and moving means for moving said movable guide part on said fixed guide part in a direction generally perpendicular to said first direction.

11. An automatic sub-mold changer according to claim 9, wherein said guide means remains stationary as said arm means moves between said first and second positions.

12. An automatic sub-mold changer according to claim 11, wherein said guide means is mounted on said injection molding machine.

13. An automatic sub-mold changer according to claim 9, wherein said arm means comprises a rotatable table which rotates as said arm means moves between said first and second positions, said guide means being fixed to said rotatable table such that said guide means is interposed between said mounted molds of said injection molding machine and said arm means when said arm means is in said second position and said guide means is interposed between said sub-mold stock means and said arm means when said arm means is in said first position.

14. An automatic sub-mold changer according to claim 6, wherein said arm means comprises arms movable between retracted and extended positions, said arms being movable in a first direction between said retracted and extended positions when said arm means is in said first position, said sub-mold stock means comprising movable stock parts movably mounted on a fixed stock part, and moving means for moving said movable stock parts on said fixed stock part in a direction generally perpendicular to said first direction.

15. An automatic sub-mold changer according to claim 14, wherein said moving means is designated a first moving means, said sub-mold stock means further comprising second moving means for moving said movable stock parts on said fixed stock part in a direction generally parallel to said first direction.

16. An automatic sub-mold changer according to claim 6, wherein said arm means comprises a rotary table rotatable about an axis, said arm means further comprising arms, said arm means further comprising arm support means mounted on said rotary table, said arm support means slidably mounting said arms for movement in an arm-moving direction between retracted and extended positions, said first and second positions of said arm means corresponding to first and second rotated positions respectively of said rotary table in which said first and second positions are 90 degrees apart.

17. An automatic sub-mold changer according to claim 16, wherein said arm means further comprises first moving means for moving said arms in said arm-moving direction, said arm means further comprising second moving means for moving said arm-support means in a direction generally perpendicular to said arm-moving direction.

18. An automatic sub-mold changer according to claim 6 further comprising heating means on said sub-mold stock means for heating the sub-molds stocked in said sub-mold stock means.

19. An automatic sub-mold changer according to claim 6, wherein said sub-molds are provided with resilient means engagable with said sub-mold stock means for resiliently returning said sub-molds on said sub-mold stock means.

20. An automatic sub-mold changer according to claim 6, wherein said arm means comprises longitudinal extending arms, said arms having spaced parallel side walls, said chuck means comprising a first chuck mounted on one of said side walls and another chuck mounted on the other of said side walls.

* * * * *